United States Patent
Khan

(10) Patent No.: US 8,121,482 B2
(45) Date of Patent: Feb. 21, 2012

(54) SPATIAL LIGHT MODULATOR-BASED RECONFIGURABLE OPTICAL ADD-DROP MULTIPLEXER AND METHOD OF ADDING AN OPTICAL CHANNEL USING THE SAME

(75) Inventor: Sajjad A. Khan, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 807 days.

(21) Appl. No.: 12/210,793

(22) Filed: Sep. 15, 2008

(65) Prior Publication Data

US 2010/0067912 A1 Mar. 18, 2010

(51) Int. Cl.
*H04J 14/02* (2006.01)

(52) U.S. Cl. ............... 398/83; 398/84; 398/87; 385/24; 385/37

(58) Field of Classification Search ............ 398/83, 398/84, 87, 152, 290, 291, 237–239, 850; 385/15–18, 24, 37, 140; 250/492.1
See application file for complete search history.

(56) References Cited

U.S. PATENT DOCUMENTS

| | | | |
|---|---|---|---|
| 6,222,954 B1 * | 4/2001 | Riza | 385/18 |
| 6,658,212 B1 * | 12/2003 | Trutna et al. | 398/84 |
| 7,528,385 B2 * | 5/2009 | Volodin et al. | 250/492.1 |
| 7,813,601 B2 * | 10/2010 | Powell | 385/24 |
| 7,826,121 B2 * | 11/2010 | Khan | 359/239 |
| 2011/0026929 A1 * | 2/2011 | Powell | 398/83 |

OTHER PUBLICATIONS

Khan, et al.; Demonstration of the MEMS Digital Micromirror Device-Based Broadband Reconfigurable Optical and-Drop Filter for Dense Wavelength-Division-Multiplexing Systems; IEEE, Journal of Lightwave Technology, vol. 25, No. 2, Feb. 2007.
Russel; U.S. Appl. No. 12/062,266, filed Apr. 3, 2007, entitled "A Pulse Width Modulation Algorithm".
Russel; U.S. Appl. No. 11/696,033, filed Apr. 3, 2007, entitled "A Pulse Width Modulation Algorithm".
Khan; U.S. Appl. No. 12/210,860, filed Sep. 15, 2008, entitled "The Use of an Angle-Selective Retro-reflector to Recapture Off-State Energy".

* cited by examiner

*Primary Examiner* — Loha Ben
(74) *Attorney, Agent, or Firm* — Warren L. Franz; Wade J. Brady, III; Frederick J. Telecky, Jr.

(57) ABSTRACT

A reconfigurable optical add-drop multiplexer (ROADM) and a method of passing at least one optical channel through the multiplexer. In one embodiment, the multiplexer includes: (1) a main input port, (2) a main output port, (3) an add input port, (4) a drop output port, (5) dispersive optics configured spatially to spread and recombine optical spectra containing optical channels and (6) a spatial light modulator having an integral, lateral-gradient volume Bragg grating and configured to assume a bar state in which at least one of the optical channels is passed from the main input port to the main output port and at least another of the optical channels is passed from the add input port to the drop output port and a cross state in which the integral, lateral-gradient volume Bragg grating is transmissive with respect to the channels.

24 Claims, 7 Drawing Sheets

SPATIAL LIGHT MODULATOR-BASED RECONFIGURABLE OPTICAL ADD-DROP MULTIPLEXER AND METHOD OF ADDING AN OPTICAL CHANNEL USING THE SAME

CROSS REFERENCE RELATED APPLICATION

Application Ser. No. 12/210,860, filed Sep. 15, 2008, entitled "The Use of an Angle-Selective Retro-Reflector to Recapture Off State Energy" (now U.S. Pat. No. 7,826,121) discloses related subject matter and is incorporated herein by reference.

TECHNICAL FIELD OF THE INVENTION

The invention is directed, in general, to optical networking and, more specifically, to a spatial light modulator (SLM)-based reconfigurable optical add-drop multiplexer (ROADM) and a method of passing at least one optical channel through the same.

BACKGROUND OF THE INVENTION

The ROADM is a key component for today's dense-wavelength-division-multiplexing (DWDM) optical communication networks. It provides the ability selectively to drop a channel (i.e., wavelength) from within a band of communication channels as well as provide the introduction of a new information-carrying channel at the same wavelength without interrupting the adjoining channels.

A number of ROADM architectures have been developed, including on-chip planar technology, which is restricted to the use of 1-D interconnections such as fibers, or 2-D interconnections such as an on-chip array of integrated-optic (IO) waveguides and switches. For example, some of these architectures include all-fiber mechanically tuned fiber Bragg grating devices (see, e.g., Nykolak, et al., "All-Fiber Active Add-Drop Wavelength Router," IEEE Photon. Technol. Lett., vol. 9, no. 5, pp. 605-606, May 1997) and an IO grating switch with IO directional-coupler devices (see, e.g., Shibata, et al., "Semiconductor Monolithic Wavelength Selective Router Using a Grating Switch Integrated with a Directional Coupler," J. Lightw. Technol., vol. 14, no. 6, pp. 1027-1032, June 1996), an array waveguide grating (AWG) multiplexer with IO thermo-optic switches (see, e.g., Saida, et al., "Athermal Silica-Based Optical Add/Drop Multiplexer Consisting of Arrayed Waveguide Gratings and Double Gate Thermo-Optical Switches," Electron. Lett., vol. 36, no. 6, pp. 528-529, Mar. 16, 2000), an AWG multiplexer with manually simulated 2×2 switches (see, e.g., Ishida, et al., "Multichannel Frequency-Selective Switch Employing an Arrayed-Waveguide Grating Multiplexer with Fold-Back Optical Paths," IEEE Photon. Technol. Lett., vol. 6, no. 10, pp. 1219-1221, October 1994), a phased array demultiplexer used in conjunction with 2×2 Mach-Zehnder interferometer electro-optic switches (see, e.g., Vreeburg, et al., "First InP-Based Reconfigurable Integrated Add-Drop Multiplexer," IEEE Photon. Technol. Lett., vol. 9, no. 2, pp. 188-190, February 1997), an IO electro-optically controlled synthesized grating-structure-based filter (see, e.g., Nolting, et al., "Electro-Optically Controlled Multiwavelength Switch for WDM Cross Connector Application," IEEE Photon. Technol. Lett., vol. 7, no. 3, pp. 315-317, March 1995), a reflective tunable resonant grating filter placed on a tiltable microelectro-mechanical-system (MEMS) platform (see, e.g., Niederer, et al., "Resonant Grating Filter for a MEMS Based Add-Drop Device at Oblique Incidence," in IEEE/LEOS Int. Conf. Optical MEMS, Conf. Dig., Aug. 20-23, 2002, pp. 99-100), a free-space linear array of 1-D twisted nematic liquid-crystal device used with diffraction gratings (see, e.g., Patel, et al., "Liquid Crystal and Grating-Based Multiple-Wavelength Cross-Connect Switch," IEEE Photon. Technol. Lett., vol. 7, no. 5, pp. 514-516, May 1995), and using dual bulk acousto-optic tunable filters (see, e.g., Riza, "Low Interchannel Crosstalk Wavelength Routing Switch Based on Bulk Acousto-Optic Tunable Filters," in Proc. IEEE LEOS Conf., Nov. 10-13, 1997, vol. 2, pp. 341-342, and, Riza, et al., "Ultrahigh 47-Db Optical Drop Rejection Multiwavelength Add-Drop Filter Using Spatial Filtering and Dual Bulk Acoustooptic Tunable Filters," Opt. Lett., vol. 23, no. 12, pp. 945-947, June 1998). The MEMS-micromirror-based add/drop filtering has been proposed and demonstrated in a linear 1-D array in which each micromirror switches one wavelength (see, e.g., Ford, et al., "Wavelength Selectable Add/Drop with Tilting Micromirrors," presented at the IEEE Lasers and Electro-Optics Society Annu. Meeting, (LEOS), Piscataway, N.J., 1997, Post deadline Paper PD2.3, and, Ford, et al., "Wavelength Add-Drop Switching Using Tilting Micromirrors," J. Lightw. Technol., vol. 17, no. 5, pp. 904-911, May 1999).

SUMMARY OF THE INVENTION

To address the above-discussed deficiencies of the prior art, one aspect of the invention provides a ROADM. In one embodiment, the ROADM includes: (1) a main input port configured to receive at least one main input optical channel from an optical network, (2) a main output port configured to provide at least one main output optical channel to the optical network, (3) an add input port configured to receive at least one add input optical channel, (4) a drop output port configured to provide at least one drop output optical channel, (5) dispersive optics coupled to the main input port, the main output port, the add input port and the drop output port and configured spatially to spread and recombine optical spectra containing at least one of the optical channels and (6) an SLM associated with the dispersive optics, having an integral, lateral-gradient volume Bragg grating and configured to assume a bar state in which the at least one of the optical channels is passed from the main input port to the main output port and at least another of the optical channels is passed from the add input port to the drop output port and a cross state in which the integral, lateral-gradient volume Bragg grating is transmissive with respect to the channels.

In another embodiment, the ROADM includes: (1) a main input port configured to receive at least one main input optical channel from an optical network and a main output port configured to provide at least one main output optical channel to the optical network, (2) an add input port configured to receive at least one add input optical channel and a drop output port configured to provide at least one drop output optical channel, (3) dispersive optics coupled to the main input port, the main output port, the add input port and the drop output port and configured spatially to spread and recombine optical spectra containing at least one of the optical channels and (4) a spatial light modulator associated with the dispersive optics and having an integral, lateral-gradient volume Bragg grating located in or on a window covering thereof, the lateral-gradient volume Bragg grating having a grating pitch gradient predetermined to correspond with wavelengths of the optical spectra incident on the spatial light modulator from the add input port that are to be routed to the drop output port, the spatial light modulator acting as a blazed grating configured to produce a diffracted light beam in a Littrow configuration for at least one of the optical channels traveling from the main input port to the main output port and a non-Littrow blazed configuration for at least one of the optical channels traveling from the add input port to the drop output port.

Another aspect of the invention provides a method of passing at least one optical channel through a ROADM. In one embodiment, the method includes: (1) receiving the at least one optical channel into an add input port of the ROADM, (2) spatially spreading optical spectra containing the at least one optical channel with dispersive optics of the ROADM, (3) configuring an SLM associated with the dispersive optics and having an integral, lateral-gradient volume Bragg grating to assume a bar state in which the at least one optical channel retro-reflects off the integral, lateral-gradient volume Bragg grating, the integral, lateral-gradient volume Bragg grating configured to be transmissive with respect to the at least one optical channel in a cross state, (4) spatially recombining the optical spectra with the dispersive optics and (5) providing the at least one optical channel at a drop output port of the ROADM.

BRIEF DESCRIPTION OF THE DRAWINGS

For a more complete understanding of the invention, reference is now made to the following descriptions taken in conjunction with the accompanying drawings, in which.

DETAILED DESCRIPTION

Most of the above-described ROADM architectures employ a single pixel to switch a given wavelength (channel). Unfortunately, this does not provide fault tolerance. In fiber optic communication and networking applications, some ROADM switches may remain in one state for more than 100,000 hours. If the pixel fails, one-wavelength-per-pixel ROADM architectures can result into a catastrophic loss of that particular channel. For this reason, a macro-pixel architecture that uses multiple pixels per wavelength is desirable.

That a spatial light modulator (SLM) (e.g., a DLP™ digital micromirror device (DMD) available from Texas Instruments, Dallas, Tex.) could be used to form a high channel-capacity DWDM add-drop filter using a 2-D micromirror array was introduced in Riza, et al., "Fault-Tolerant Dense Multiwavelength Add Drop Filter with a Two-Dimensional Digital Micromirror Device," Appl. Opt., vol. 37, no. 27, pp. 6355-6361, September 1998, Riza, et al., "Small-Tilt Micromirror-Device-Based Multiwavelength Three-Dimensional 2×2 Fiber Optic Switch Structures," Opt. Eng., vol. 39, no. 2, pp. 379-386, February 2000, U.S. Pat. No. 6,222,954, which issued on Apr. 24, 2001, to Riza, "Fault-Tolerant Fiber-Optical Beam Control Modules," and Khan, et al., "Demonstration of the MEMS Digital Micromirror Device-Based Broadband Reconfigurable Optical Add-Drop Filter for Dense Wavelength-Division-Multiplexing Systems," J. Lightw. Technol. 25, 520-526 (2007), all incorporated herein by reference. Although they operate well, the ROADMs therein described require bulk retro-reflection optical elements to render them fully reversible in both bar and cross states. The elements take the form of a curved mirror or a collimating lens and flat mirror and potentially add cost, complexity, size and weight to the ROADMs and potentially increase light losses therein. Although such a bulk optics approach nominally provide the desired add-to-drop routing functionality, they are nevertheless space consuming and undesirable for fiber-optics applications, where most of the networking equipment takes the form of line-cards that should conform to a compact form-factor. A ROADM that does not require those additional bulk elements would be advantageous and therefore desirable.

A ROADM is a 2×2 wavelength-selective switch, meaning that it has two input ports and two output ports. A certain wavelength from one of the two input ports can be routed to any one of the two output ports. Reconfigurability, as the name suggests, means that any of the wavelengths or channels from any of the two input ports can be selectively routed to any of the two output ports at will and dynamically. Reversibility means that any of the ports functionality can be changed dynamically at will meaning that a port can be configured to be used as either an input or an output but the number of input ports remains equal to the number of output ports.

Figure 1A:
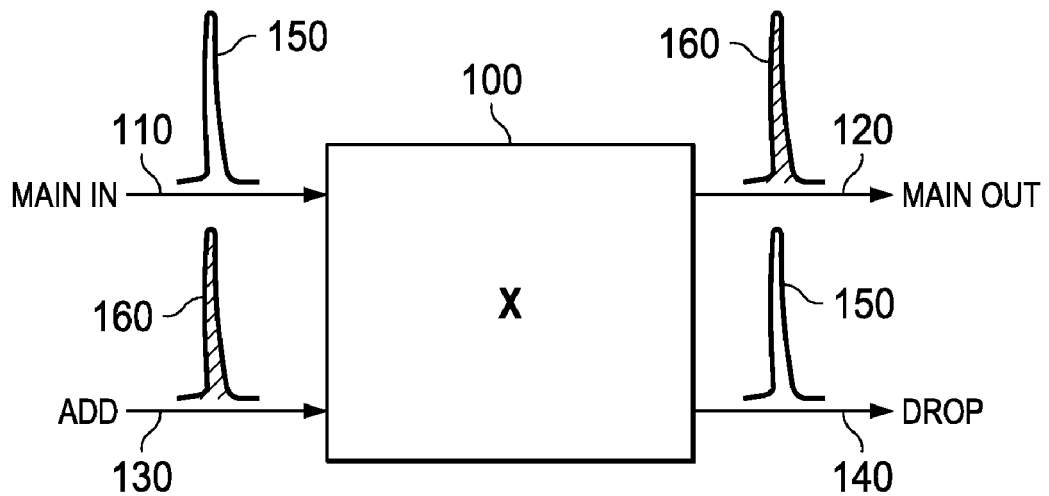
FIGS. 1A and 1B are high-level schematic diagrams of a ROADM in respective cross and bar states.
Figure 1B:
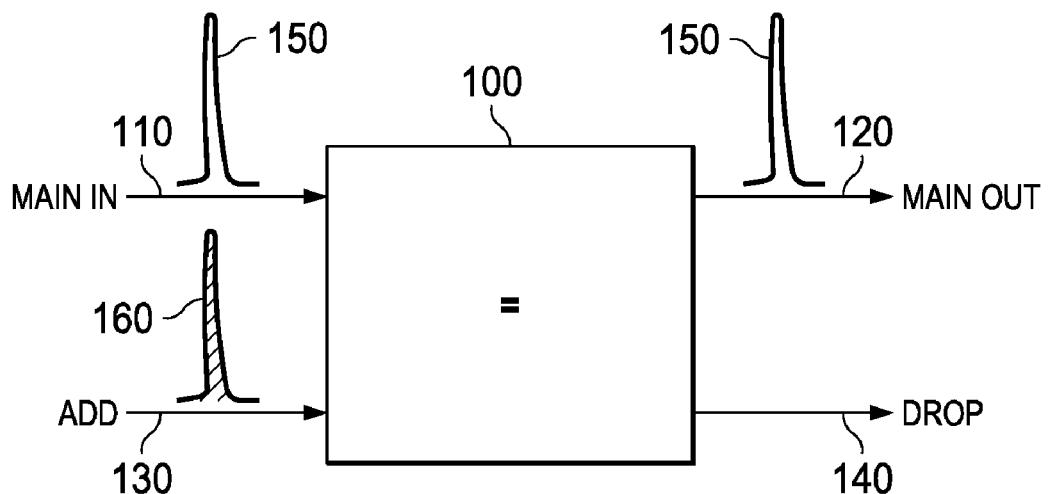

Before describing various embodiments of a ROADM constructed according to the principles of the invention, the problem of reversibility will be described. FIGS. 1A and 1B are high-level schematic diagrams of an SLM-based ROADM 100 in respective cross and bar states and will be used to describe the operation of the ROADM 100 in the context of a DWDM optical network (not shown). The ROADM 100 has a main input port 110 coupled to one backbone segment of the optical network and a main output port 120 coupled to another backbone segment of the optical network. The backbone segments are part of a backbone of the optical network, e.g., a Fiber Distributed Data Interface, or FDDI, ring. An add input port 130 allows one or more channels (wavelengths) to be inserted into (added to) the backbone (by way of the main output port 120). A drop output port 140 allows one or more channels (wavelengths) received by way of the main input port 110 to be extracted (dropped) from the backbone. Naming convention and terminology may vary depending upon the reference, e.g., the "main input port" port is sometimes called the "input" port, while the "main-output" port is sometimes called the "express" port, etc.

The ROADM 100 is controllably switchable between two different states: a cross state and a bar state. FIG. 1A shows the ROADM 100 in the cross state (signified by an "X" label in the ROADM 100). FIG. 1B shows the ROADM 100 in the bar state (signified by an "=" label in the ROADM 100). Since the optical network is a WDM network, the main input port 110 is assumed to receive plural channels. However, FIGS. 1A and 1B show only one channel 150 for clarity's sake. The add input port 130 may receive one or more channels, but only one channel 160 is shown, again for clarity's sake. It is assumed that the wavelength of the channel 150 is the same as that of the channel 160 but different from that of any other channels received by the main input port 110 or the add input port 130.

In FIG. 1A (illustrating the cross state), the main output port 120 provides the channel 160, and the drop output port 140 provides the channel 150. The net result is that the channel 150 has been dropped from the backbone, and the channel 160 has been added to the backbone, effecting a substitution of the channel 160 for the channel 150. In FIG. 1B (illustrating the bar state), the main output port 120 continues to provide the channel 150 (no add or drop has taken place). However, the drop output port 140 does not provide the channel 160; the channel 160 did not carry over from the add input port 130. Thus, the channel 160 is interrupted, the ROADM 100 is not a fully functional 2×2 switch in its bar state.

Figure 2:
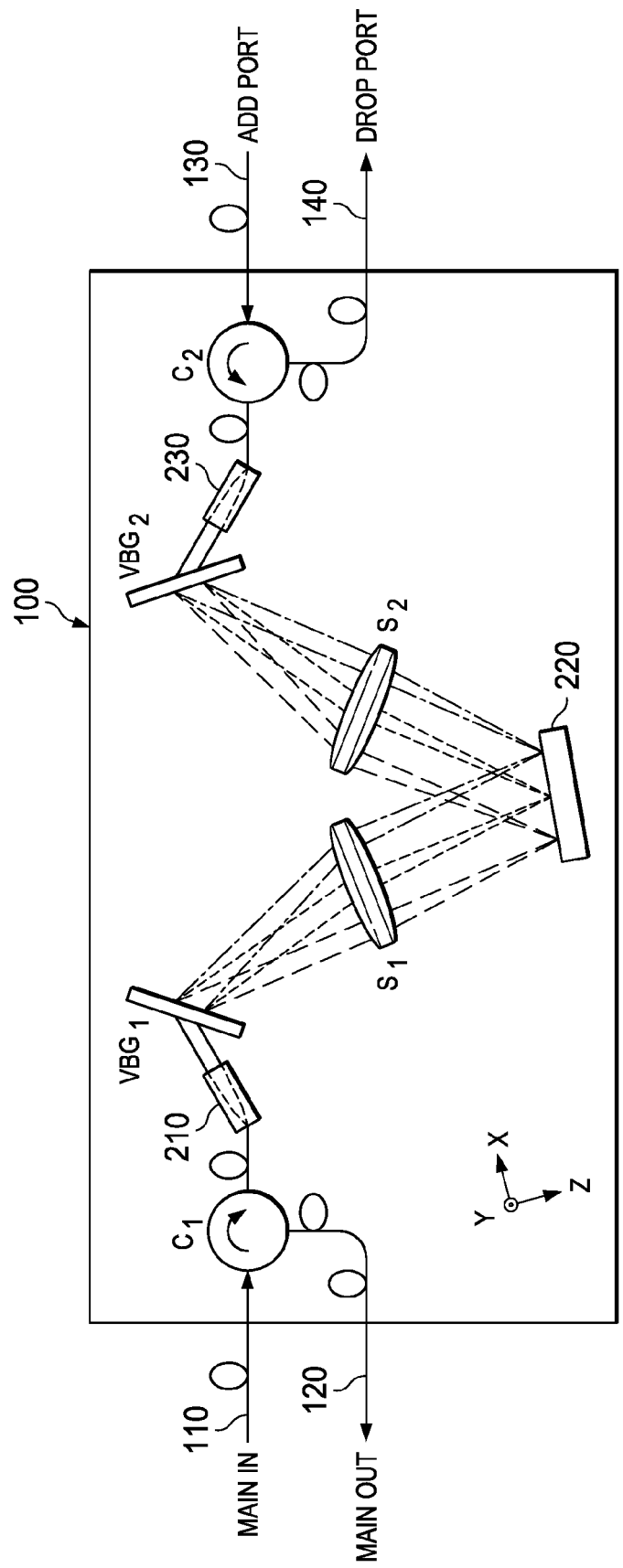
FIG. 2 is a diagram of one embodiment of a ROADM constructed according to the principles of the invention.

To understand why the SLM-based ROADM 100 is not a fully functional 2×2 switch in its bar state, an SLM-based ROADM will now be described. Various embodiments of a ROADM constructed according to the principles of the invention will then be described. FIG. 2 is a diagram of one embodiment of an SLM-based ROADM.

A first fiber-optic circulator $C_1$ receives plural channels via the main input port 110 and provides plural channels via the main output port 120. $C_1$ routes the received plural channels to a first gradient index of refraction (GRIN) fiber for lens) collimator 210, which collimates the optical input signals (channels) from the fiber into freespace optical signals (channels) incident on a volume Bragg grating (VBG), $VBG_1$. VBG1 angularly separates the optical channel spectra. A first collimating (e.g., spherical) lens $S_1$ steers the channel spectra onto the face of an SLM 220 forming a spot pattern that forms a line. A 2-D grid of micromirrors (not shown) in the SLM 220 is then controlled to reflect each spot independently either toward a second collimating lens $S_2$ to effect a cross state for channels to be dropped or back toward the first collimating lens $S_1$ to effect a bar state for channels to be passed through the ROADM 100. In the latter case, the SLM 220 may act as a blazed grating with the diffracted light beam being in the high-efficiency Littrow configuration, resulting in a low insertion loss for channels being conveyed from the main input port 110 to the main output port 120.

$S_2$ focuses the spots representing the channels to be dropped on a second VBG, $VBG_2$, which recombines and steers them toward a second GRIN fiber collimator 230. The second GRIN collimator 230 routes these channels towards a second fiber-optic circulator $C_2$, which routes them to the drop output port 140.

$C_2$ receives one or more channels to be added via the add input port 130, routing them to the second GRIN collimator 230. The second GRIN collimator 230 collimates the optical signals (channels) from the add input port 130 into freespace optical signals (channels) incident on $VBG_2$. $VBG_2$ angularly separates the optical channel spectra. $S_2$ steers the add input port spectra into a spot pattern formed onto the face of the SLM 220, where the relevant micromirrors are already oriented to reflect the added channel(s) toward $S_1$. $S_1$ focuses the spots originally reflected back from the SLM 220 (those to be passed through the ROADM 100) and the line(s) representing the added channel(s) on $VBG_1$, which recombines and steers them toward the first GRIN fiber collimator 210. The first GRIN collimator 210 focuses the channels into $C_1$, which routes the channels to the main output port 120.

In the illustrated embodiment, the distances between the first and second GRIN lens collimators 210, 230 and their corresponding first and second VBGs, $VBG_1$ and $VBG_2$, are chosen to be half-self imaging distances such that the Gaussian light beams emerging from the GRIN lenses 210, 230 form beam waists at the location of the corresponding VBG (see, e.g., Buren, et al., "Foundations for low-loss Fiber gradient-index lens pair coupling with the self-imaging mechanism," Appl. Opt.-LP, vol. 42, no. 3, pp. 550-565, January 2003). $VBG_1$ and $VBG_2$ are placed at their Bragg angle $\theta_{Bragg}$ with respect to the input light beam so that the input channel spectrum spreads in the first order by an angle $2\Delta\theta$ along the x-dimension, where:

$$2\Delta\theta = \theta_{max} - \theta_{min},$$

$$\theta_{max} = \sin^{-1}[(\lambda_{max}/L) - \sin\theta_{Bragg}], \text{ and}$$

$$\theta_{min} = \sin^{-1}[(\lambda_{min}/L) - \sin\theta_{Bragg}],$$

and $\lambda_{max}$ and $\lambda_{min}$ respectively correspond to the maximum and minimum channel wavelengths. The spatial extent of any wavelength $\lambda$ is defined by the VBG resolution:

$$\delta\lambda = L\lambda_c/2W|m|,$$

where m is the grating order number, L is the grating period, $\lambda_c$ is the grating center wavelength, and 2 W is the $1/e^2$ beam diameter incident on the grating.

In the illustrated embodiment, $S_1$ and $S_2$ spread their input source spectra spatially onto the SLM 220 such that the spectrum size is $X=2F\tan(\Delta\theta)$ in the x-dimension, where $F_n$ is the focal length of the first collimating lens $S_n$ where n represents 1, 2 or both 1 and 2. In the illustrated embodiment, $S_1$ and $S_2$ spread their input source spectra such that the depth of focus of the input source spectra is at least about twice a distance between the SLM 220 and the lateral-gradient VBG that is integral with the SLM 220. The input light beam with $1/e^2$ beam waist of $w_n$ at the $VBG_1$ location is transformed at the SLM location into a waist $w_{n+1}$ which is given by:

$$w_{n+1} = F\lambda/\pi w_n.$$

Thus, the input optical spectrum to the ROADM 100 forms a generally rectangular-shaped beam that is X units wide and 2 $w_{n+1}$ units high in the plane of the SLM 220. In effect, this allows independent control of $N=X/2w_{n+1}$ channels within the $\Delta\lambda = \lambda_{max} - \lambda_{min}$ source spectrum. Thus, the wavelength-control resolution of the illustrated embodiment of the ROADM 100 is $\Delta\lambda/N$, with the VBG resolution $\delta\lambda$ being the fundamental limiting resolution.

Figure 3A:
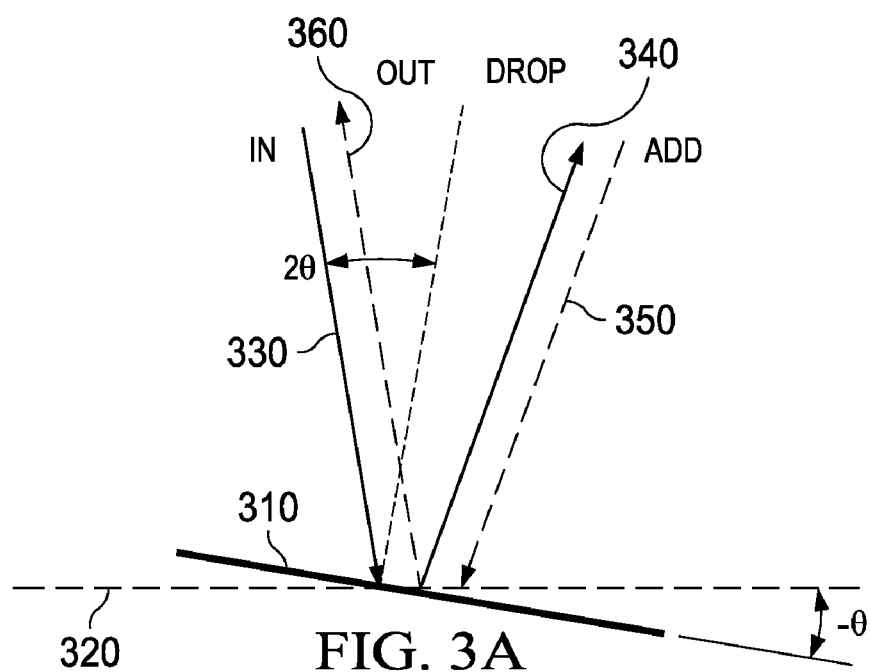
FIGS. 3A and 3B geometrically illustrate the operation of an SLM-based ROADM in respective cross and bar states.
Figure 3B:
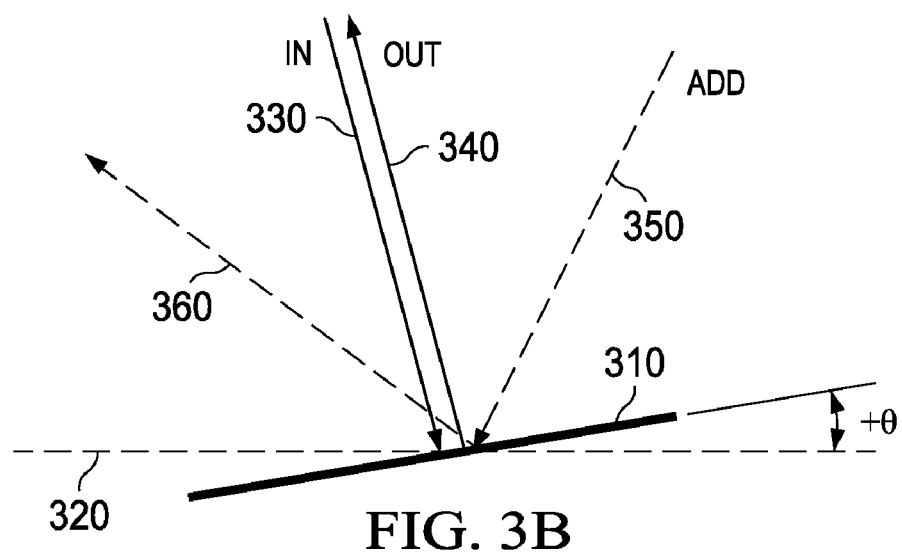

Turning briefly to FIGS. 3A and 3B, geometrically illustrated are the operation of an incomplete 2×2 switch-based SLM-based ROADM in respective cross and bar states. The problem with the ROADM identified above is that added channels are not passed to the drop output port in the bar state. FIGS. 3A and 3B illustrate why. FIGS. 3A and 3B illustrate a single micromirror 310 of the 2-D grid of micromirrors in the SLM 220 of FIG. 2. The micromirror 310 may be controllably oriented at an angle of $-\theta$ or $+\theta$ relative to a plane 320 of the face of the SLM 220. FIG. 3A shows the micromirror 310 oriented at $-\theta$ to effect a cross state. Channels received via the main input port 110 of FIGS. 1A and 1B are properly routed to the drop output port 140 of FIGS. 1A and 1B as lines 330, 340 represent. Likewise, channels received via the add input port 130 of FIGS. 1A and 1B are properly routed to the main output port 120 of FIGS. 1A and 1B as lines 350, 360 represent. FIG. 3B shows the micromirror 310 oriented at $+\theta$ to effect a bar state. Channels received via the main input port 110 are properly routed to the main output port 120 as the lines 330, 340 represent. Unfortunately, channels received via the add input port 130, represented by the line 350, are not routed to the drop output port 140. Instead, they are steered in a direction indicated by the line 360. What is needed is a structure for retro-reflecting the channels back along the line

360 such that they return along the line 350 and are properly routed to the drop output port 140. The references set forth in the first paragraph of the Detailed Description above employ bulk retro-reflection optical elements to render their ROADMs fully reversible in both the bar and cross states.

Returning now to FIG. 2, a novel and advantageous SLM will be described that eliminates the need for such optical elements. The SLM 220 of FIG. 2 has an integral, laterally gradient VBG (not shown, but illustrated in detail in subsequent FIGs.) located over its micromirrors. The VBG is designed such that, in the bar state, channels received via the add input port 130 are retro-reflected, by this integral laterally gradient VBG, back towards the drop output port 140. Accordingly, $C_2$ receives one or more channels via the add input port 130, routing it or them to the second GRIN collimator 230. The second GRIN collimator 230 spreads the channel(s) over $VBG_2$. $VBG_2$ angularly separates the optical channel spectrum or spectra. $S_2$ steers the channel(s) spectrum or spectra onto the face of the SLM 220 in the form of spot(s) that form a line, where the relevant micromirrors are already oriented to reflect them such that the laterally gradient VBG that is integral to the SLM 220 retro-reflects them back to the same micromirrors and back toward $S_2$. $S_2$ focuses the spots originally reflected back from the SLM 220 (those to be passed through the ROADM 100 to the drop output port 140) and the spots representing any dropped channels on $VBG_2$, which recombines and steers them toward the second GRIN fiber collimator 230. The second GRIN collimator 230 focuses the channels into $C_2$, which routes the channels to the drop output port 140, as is desired.

Figure 4A:
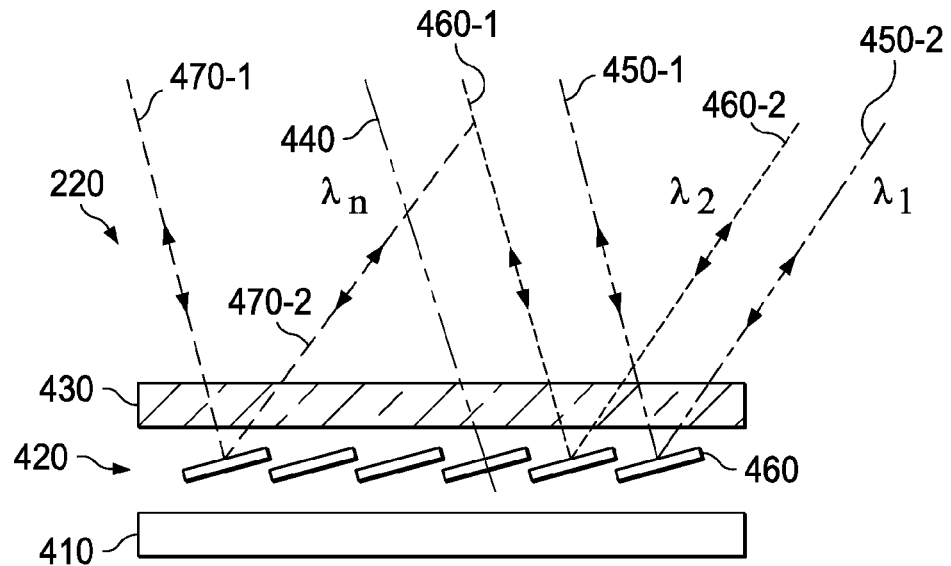
FIGS. 4A and 4B geometrically illustrate the operation of an SLM-based ROADM, in which the SLM has an integral, lateral-gradient volume Bragg grating, in respective bar and cross states.
Figure 4B:
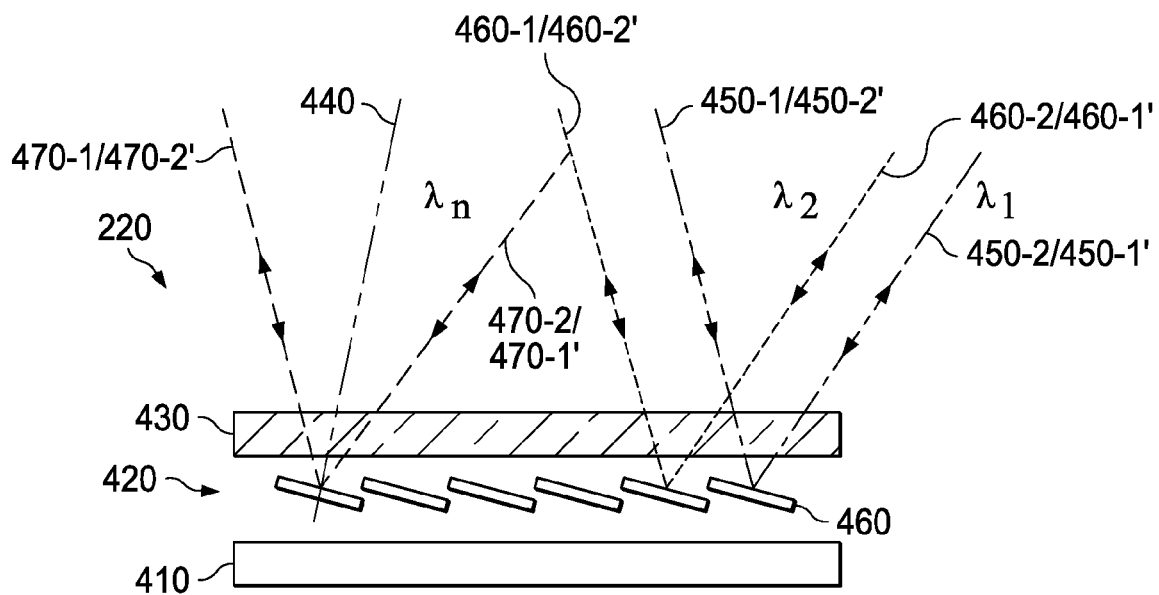

FIGS. 4A and 4B geometrically illustrate the operation of an SLM-based ROADM, in which the SLM has an integral, lateral-gradient volume Bragg grating, in respective bar and cross states. FIG. 4A shows the bar state and is taken along lines 4-4 of FIG. 6. As those skilled in the pertinent art are aware, an SLM such as a Texas Instruments DLP™ digital micromirror device (DMD) has a substrate 410 to which micromirrors 420 are hingedly mounted. In the embodiment of FIG. 4A, the micromirrors 420 are substantially square and hinged along the diagonals thereof such that they can be oriented between −θ and +θ angles as shown in FIGS. 3A and 3B under control of MEMS actuators (not shown) associated with the micromirrors 420. The micromirrors 420 may be arranged in a Cartesian or diamond 2-D grid. For simplicity's sake, FIG. 4A shows only one line (row or column) of micromirrors 420.

The SLM 220 is not conventional, however. The SLM 220 has an integral, lateral-gradient VBG 430 that lies over (e.g., on the surface of) the micromirrors 420. "Lateral gradient" indicates that pitch of the VBG varies such that the Bragg wavelength, $\lambda_{Bragg}$, shifts from one end of the grating to the other in a desired manner to match the wavelength spread incident on the micromirrors for a particular ROADM application. The pitch may vary smoothly (e.g., linearly) or stepwise across the integral, lateral-gradient VBG 430. The integral, lateral-gradient VBG 430 is therefore designed such that light of certain wavelengths incident at a particular incidence angle upon the integral, lateral-gradient VBG 430 is reflected in a Littrow configuration in the bar-state of the 2×2 ROADM switch. Other wavelengths and incident angles are transmitted un-perturbed. In the embodiment of FIG. 4A, the certain wavelengths correlate with the various rays representing various channels projected onto the face of the SLM 220 within the ROADM 100 of FIG. 2. In the embodiment of FIG. 4A, the Bragg angle is based on the angle at which the light is incident on the face of the SLM 220 and the orientation angle, θ, that the micromirrors 420 have with respect to the plane of the SLM 220 when the micromirrors are oriented to achieve a bar state. A line normal to the orientation of the micromirrors in their bar state is referenced as 440.

As shown in FIG. 4A, a representative beam of light of a first wavelength (bearing a first channel) 450-1 is incident on the face of the SLM 220 at an angle substantially normal to one of the micromirrors, referenced as micromirror 460. The light beam 450-1 may correspond, for example, to a channel that is to pass from the main input port 110 to the main output port 120 of the ROADM 100 of FIG. 1. The light beam 450-1 passes through the integral, lateral-gradient VBG 430 and is reflected off the micromirror 460 back in the opposite direction, passing through the integral, lateral-gradient VBG 430 once again. However, since the light beam 450-1 is not incident on the integral, lateral-gradient VBG 430 at the Bragg angle required for Bragg reflection to take place, it is transmitted substantially through the integral, lateral-gradient VBG 430 in both directions as FIG. 4A shows.

A representative beam of light of the same, first wavelength (bearing a first channel) 450-2 is also incident on the face of the SLM 220. The light beam 450-2 may correspond, for example, to a channel that is to pass from the add input port 130 to the drop output port 140 of the ROADM 100 of FIG. 2. However, the angle at which the light beam 450-2 is incident on the micromirror 460 differs from normal. The light beam 450-2 passes through the integral, lateral-gradient VBG 430 and is reflected off the micromirror 460. However, the light beam 450-2 is substantially equal to the Bragg wavelength and reflects off the micromirror 460 at an angle that is substantially equal to the Bragg angle for Bragg reflection off the integral, lateral-gradient VBG 430. Consequently, it is retro-reflected off the integral, lateral-gradient VBG 430, back to the micromirror 460 and back in the direction from which it originally came, passing through the integral, lateral-gradient VBG 430 once again.

Beams 460-1, 460-2, are processed in substantially the same way as the light beams 450-1, 450-2, except that the light beams 460-1, 460-2 differ in wavelength from the light beams 450-1, 450-2 and correspond in wavelength to the localized portion of the integral, lateral-gradient VBG 430 at which they are incident. Likewise, light beams 470-1, 470-2 are processed in substantially the same way as the light beams 450-1, 450-2, 460-1, 460-2 except that the light beams 470-1, 470-2 differ in wavelength from the light beams 450-1, 450-2 and the light beams 460-1, 460-2 and correspond in wavelength to the localized portion of the integral, lateral-gradient VBG 430 at which they are incident.

FIG. 4B geometrically illustrate the operation of the SLM-based ROADM in the cross state. Reference numerals are as they were in FIG. 4A. In the cross state, the integral, lateral-gradient VBG 430 is transmissive with respect to the channels. The SLM 220 acts as a blazed grating configured to produce diffracted light beams for optical channels traveling from the main input port to the drop output port and from the add input port to main output ports, as shown. For example, a light beam 450-1 from the main input port is as incident upon the SLM 220. After reflection from the SLM 220, the light beam, now 450-2, is routed to the drop output port. Although it is difficult to illustrate in FIG. 4B, another light beam 450-1' of the same wavelength is incident on the SLM 220 from the add input port, and the SLM 220 routes this light beam, now 450-2', to the main output port. These two collinear and spatially overlapping light beams are of the same wavelength, but are independent and bear separate channels. Other information-carrying wavelengths/channels undergo the same process and are hence labeled as they are in FIG. 4B.

Figure 5A:
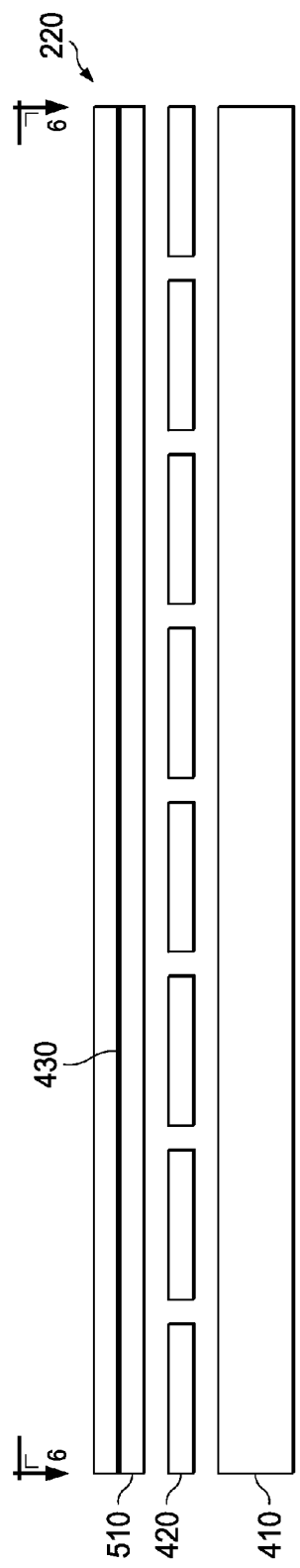
FIGS. 5A-5C are elevational views of respective first, second and third embodiments of an SLM having an integral, lateral-gradient volume Bragg grating and constructed according to the principles of the invention.
Figure 5B:
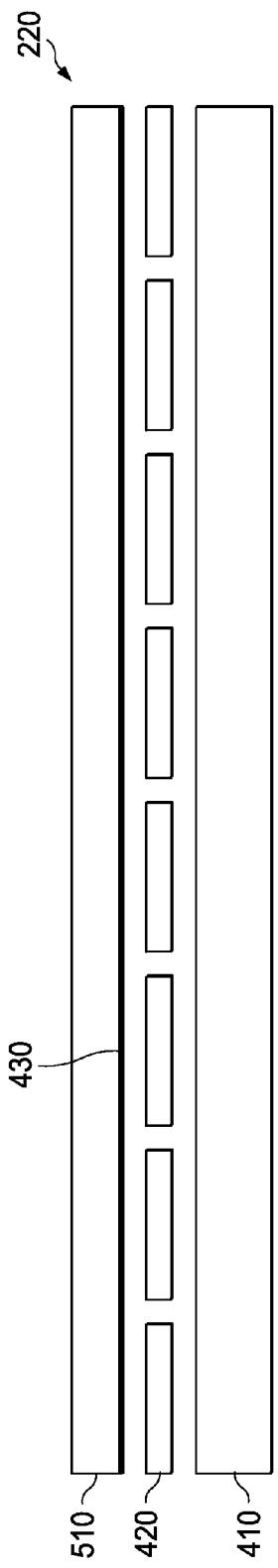
Figure 5C:
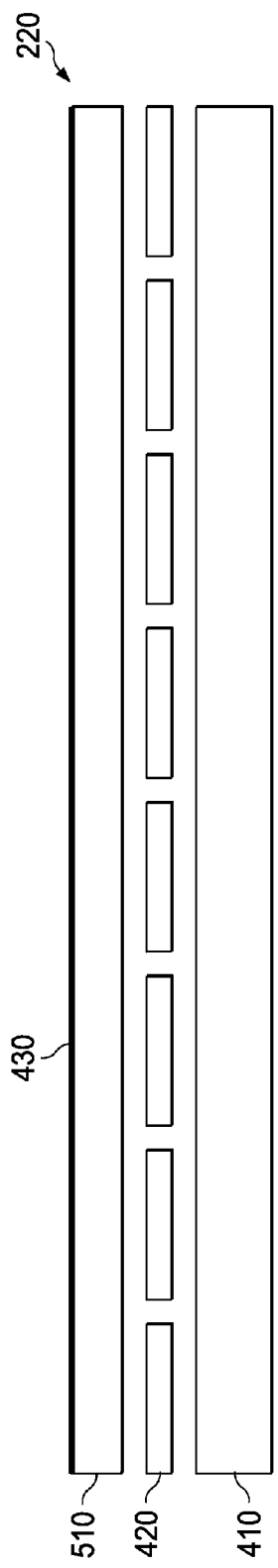
Figure 6:
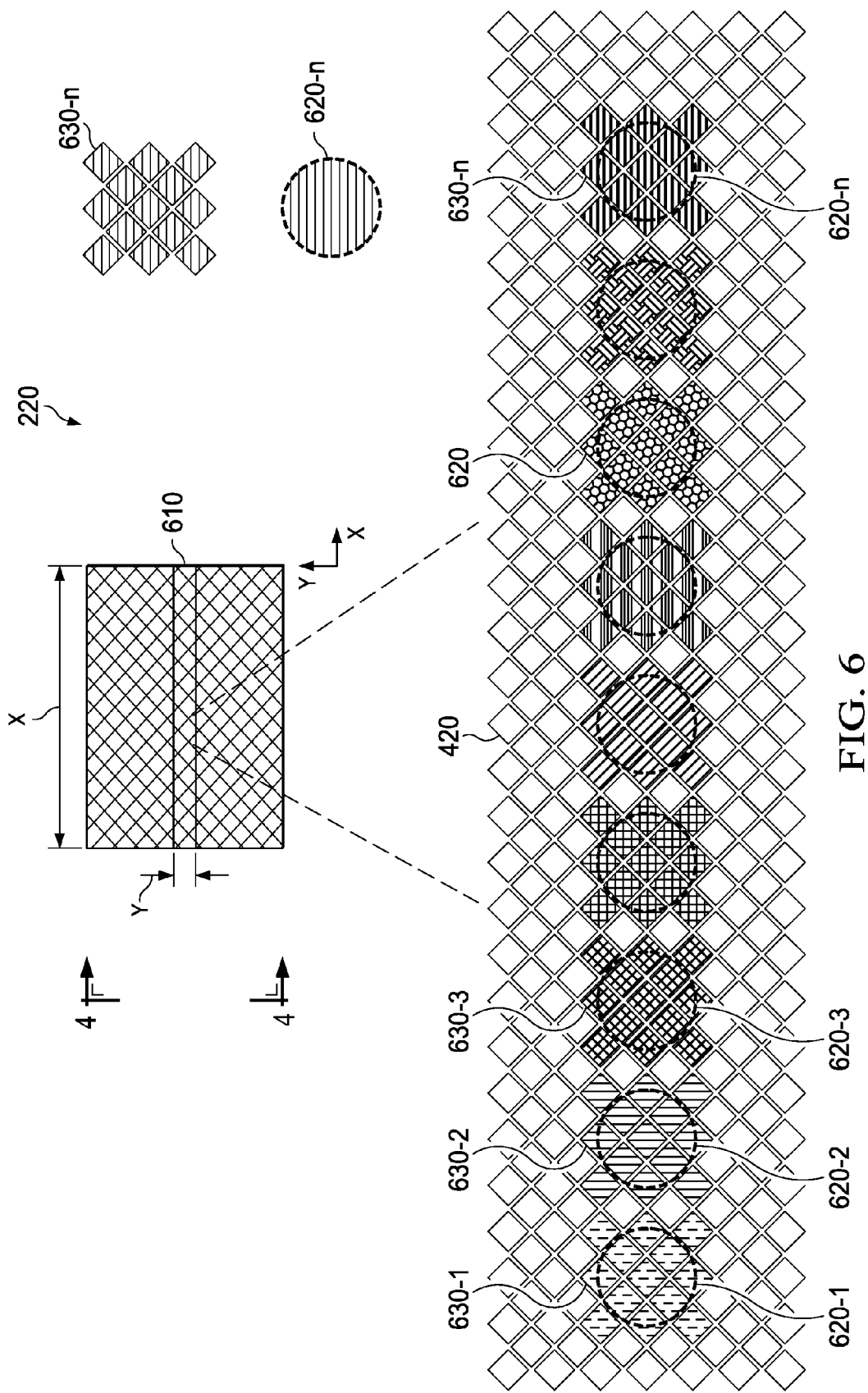
FIG. 6 is a plan view of one embodiment of an SLM having an integral, lateral-gradient volume Bragg grating and constructed according to the principles of the invention.

FIGS. 5A-5C are elevational views, taken along lines 5-5 of FIG. 6, of respective first, second and third embodiments of an SLM 220 having an integral, lateral-gradient VBG 430 and constructed according to the principles of the invention. FIG. 5A shows the integral, lateral-gradient VBG 430 as being located within a window covering 510 located over the micromirrors 420. In this embodiment, the window covering 510 may consist of or include a photosensitive glass material in which the integral, lateral-gradient VBG 430 is formed. Those skilled in the pertinent art are familiar with the manner in which an integral, lateral-gradient VBG may be formed in a photosensitive material such as glass. FIG. 5B shows the integral, lateral-gradient VBG 430 as being located on a lower surface of the window covering 510. The integral, lateral-gradient VBG 430 may be gradient volume hologram. Those skilled in the pertinent art are familiar with the manner in which gradient volume holograms are made and used. FIG. 5C shows the integral, lateral-gradient VBG 430 as being located on an upper surface of the window covering 510. Again, the integral, lateral-gradient VBG 430 may be gradient volume hologram. The lateral gradient can be either a continuous linear gradient or a step-wise linear gradient.

Figure 7:
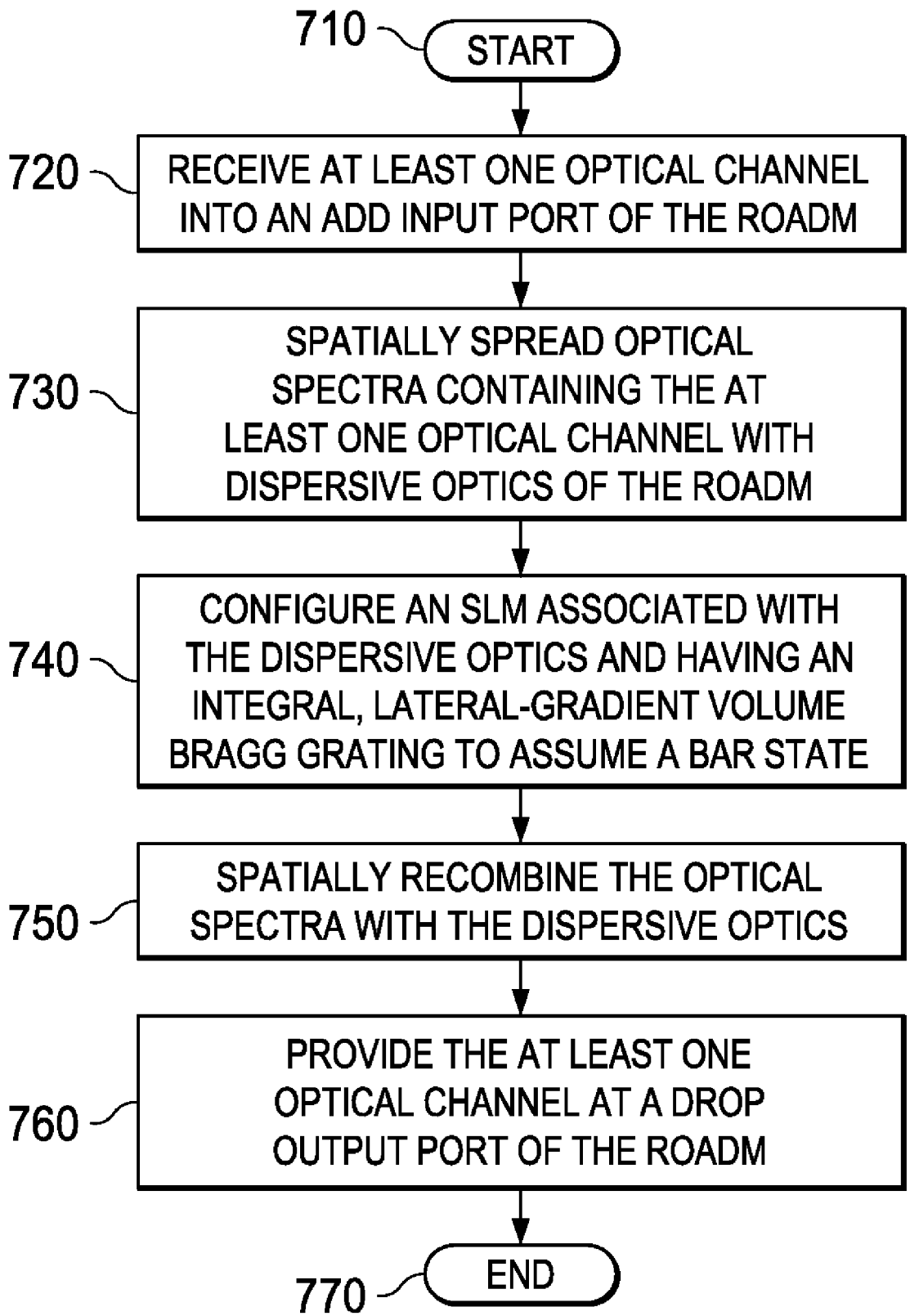
FIG. 7 is a flow diagram of one embodiment of a method of passing at least one optical channel through a ROADM based on an SLM having an integral Bragg grating carried out according to the principles of the invention.

FIG. 6 is a plan view, taken along lines 6-6 of FIGS. 5A-5C of one embodiment of an SLM 220 having an integral, lateral-gradient VBG and constructed according to the principles of the invention. FIG. 6 is presented primarily for the purpose of showing how a spectrum processing zone 610 contains spots 620-*n* corresponding to channels to be steered by the micromirrors 420. The spots 620-*n* are illustrated in FIG. 7 as being larger than the micromirrors 420 such that multiple micromirrors 420 are used to reflect each of the spots (channels) 620-*n*. In other embodiments the spots 620-*n* formed by the illuminating wavelength channels with dispersive optics on the SLM 220 may illuminate one or more micromirrors and may be circular, rectangular or any other shape based upon the optics used for forming these spots on the SLM 220. The array of micromirrors 630-*n* associated with a certain channel spot size 620-*n* may be arranged in an appropriate array shape and size to optimally conform to the illuminating spot while causing minimal interference with adjoining channel spots. One such arrangement of array shape is shown as 630-*n* in FIG. 7. Note that different colors (values of n) in FIG. 7 represent different wavelengths/channels ($\lambda$).

Since the micromirrors 420 are independently steerable, the micromirrors 420 are able to steer the spots (channels) 620-*n* independently, such that the ROADM 100 of FIG. 2 may be in a bar state for one or some channels and in a cross state for any remaining channels. In the illustrated embodiment, each of the spots 620-*n* impinges on 13 of the micromirrors 420, the invention is not limited to a particular number of micromirrors 420. The SLM 220 has a periphery (not shown); the 2-D grid of micromirrors 420 lies within the periphery.

FIG. 7 is a flow diagram of one embodiment of a method of passing at least one optical channel through a ROADM based on an SLM having an integral Bragg grating carried out according to the principles of the invention. The method begins in a start step 710. In a step 720, the at least one optical channel is received into an add input port of the ROADM. In a step 730, optical spectra containing the at least one optical channel are spatially spread with dispersive optics of the ROADM. In a step 740, an SLM associated with the dispersive optics and having an integral, lateral-gradient volume Bragg grating is configured to assume a bar state. In the bar state, the optical channel retro-reflects off the integral, lateral-gradient volume Bragg grating. In a step 750, the optical spectra are spatially recombined with the dispersive optics. In a step 760, the at least one optical channel is provided at a drop output port of the ROADM. The method ends in an end step 770.

Those skilled in the art to which the invention relates will appreciate that other and further additions, deletions, substitutions and modifications may be made to the described embodiments without departing from the scope of the invention.

What is claimed is:

1. A reconfigurable optical add-drop multiplexer, comprising:
   a main input port configured to receive at least one main input optical channel from an optical network;
   a main output port configured to provide at least one main output optical channel to said optical network;
   an add input port configured to receive at least one add input optical channel;
   a drop output port configured to provide at least one drop output optical channel;
   dispersive optics coupled to said main input port, said main output port, said add input port and said drop output port and configured spatially to spread and recombine optical spectra containing at least one of said optical channels; and
   a spatial light modulator associated with said dispersive optics, having an integral, lateral-gradient volume Bragg grating and configured to assume a bar state in which said at least one of said optical channels is passed from said main input port to said main output port and at least another of said optical channels is passed from said add input port to said drop output port and a cross state in which said integral, lateral-gradient volume Bragg grating is transmissive with respect to said channels.

2. The multiplexer as recited in claim 1 wherein said integral, lateral-gradient volume Bragg grating has a pitch gradient selected from the group consisting of:
   smoothly varying in one dimension, and
   step-wise varying in one dimension.

3. The multiplexer as recited in claim 1 wherein said spatial light modulator further has a window covering composed of photosensitive glass in which said integral, lateral-gradient volume Bragg grating is located.

4. The multiplexer as recited in claim 1 wherein said spatial light modulator further has a window covering and said integral, lateral-gradient volume Bragg grating is a gradient volume hologram located on said window covering.

5. The multiplexer as recited in claim 1 wherein said dispersive optics comprise first and second optical circulators, first and second gradient index of refraction collimators, first and second volume Bragg gratings and first and second collimating lenses.

6. The multiplexer as recited in claim 5 wherein a distance between each of said first and second gradient index of refraction collimators and corresponding ones of said first and second volume Bragg gratings is a half-self imaging distance.

7. The multiplexer as recited in claim 5 wherein said first and second volume Bragg gratings are placed at a Bragg angle with respect to input light beams thereof.

8. The multiplexer as recited in claim 1 wherein optical light beams comprising said optical channels have a depth of focus thereof that is at least about twice a distance between micromirrors of said spatial light modulator and said integral, lateral-gradient volume Bragg grating.

9. A method of passing at least one optical channel through a reconfigurable optical add-drop multiplexer, comprising:
   receiving said at least one optical channel into an add input port of said multiplexer;

spatially spreading optical spectra containing said at least one optical channel with dispersive optics of said multiplexer;

configuring a spatial light modulator associated with said dispersive optics and having an integral, lateral-gradient volume Bragg grating to assume a bar state in which said at least one optical channel retro-reflects off said integral, lateral-gradient volume Bragg grating, said integral, lateral-gradient volume Bragg grating configured to be transmissive with respect to said at least one channel in a cross state;

spatially recombining said optical spectra with said dispersive optics; and providing said at least one optical channel at a drop output port of said multiplexer.

10. The method as recited in claim 9 wherein said integral, lateral-gradient volume Bragg grating has a pitch gradient selected from the group consisting of:
smoothly varying in one dimension, and
step-wise varying in one dimension.

11. The method as recited in claim 9 wherein said spatial light modulator further has a window covering composed of photosensitive glass in which said integral, lateral-gradient volume Bragg grating is located.

12. The method as recited in claim 9 wherein said spatial light modulator further has a window covering and said integral, lateral-gradient volume Bragg grating is a gradient volume hologram located on said window covering.

13. The method as recited in claim 9 wherein said dispersive optics comprise first and second optical circulators, first and second gradient index of refraction collimators, first and second volume Bragg gratings and first and second collimating lenses.

14. The method as recited in claim 13 wherein a distance between each of said first and second gradient index of refraction collimators and corresponding ones of said first and second volume Bragg gratings is a half-self imaging distance.

15. The method as recited in claim 13 wherein said first and second volume Bragg gratings are placed at a Bragg angle with respect to input light beams thereof.

16. The method as recited in claim 9 wherein optical light beams comprising said optical channels have a depth of focus thereof that is at least about twice a distance between micromirrors of said spatial light modulator and said integral, lateral-gradient volume Bragg grating.

17. A reconfigurable optical add-drop multiplexer, comprising:
a main input port configured to receive at least one main input optical channel from an optical network and a main output port configured to provide at least one main output optical channel to said optical network;
an add input port configured to receive at least one add input optical channel and a drop output port configured to provide at least one drop output optical channel;
dispersive optics coupled to said main input port, said main output port, said add input port and said drop output port and configured spatially to spread and recombine optical spectra containing at least one of said optical channels; and
a spatial light modulator associated with said dispersive optics and having an integral, lateral-gradient volume Bragg grating located in or on a window covering thereof, said lateral-gradient volume Bragg grating having a grating pitch gradient predetermined to correspond with wavelengths of said optical spectra incident on said spatial light modulator from said add input port that are to be routed to said drop output port, said spatial light modulator acting as a blazed grating configured to produce a diffracted light beam in a Littrow configuration for at least one of said optical channels traveling from said main input port to said main output port and a non-Littrow blazed configuration for at least one of said optical channels traveling from said add input port to said drop output port.

18. The multiplexer as recited in claim 17 wherein said integral, lateral-gradient volume Bragg grating has a pitch gradient selected from the group consisting of:
smoothly varying in one dimension, and
step-wise varying in one dimension.

19. The multiplexer as recited in claim 17 wherein said window covering is composed of photosensitive glass and said integral, lateral-gradient volume Bragg grating is located in said window covering.

20. The multiplexer as recited in claim 17 wherein said integral, lateral-gradient volume Bragg grating is a gradient volume hologram located on said window covering.

21. The multiplexer as recited in claim 17 wherein said dispersive optics comprise first and second optical circulators, first and second gradient index of refraction collimators, first and second volume Bragg gratings and first and second collimating lenses and said spatial light modulator is configured to assume a bar state in which at least one of said optical channels is passed from said main input port to said main output port and at least another of said optical channels is passed from said add input port to said drop output port.

22. The multiplexer as recited in claim 21 wherein a distance between each of said first and second gradient index of refraction collimators and corresponding ones of said first and second volume Bragg gratings is a half-self imaging distance.

23. The multiplexer as recited in claim 21 wherein said first and second volume Bragg gratings are placed at a Bragg angle with respect to input light beams thereof.

24. The multiplexer as recited in claim 17 wherein optical light beams comprising said optical channels are spatially spread such that a depth of focus thereof is at least about twice a distance between micromirrors of said spatial light modulator and said integral, lateral-gradient volume Bragg grating.

* * * * *